Sept. 19, 1939.   D. N. SHARMA   2,173,137
RADIO BEACON
Filed Feb. 8, 1937   2 Sheets-Sheet 1
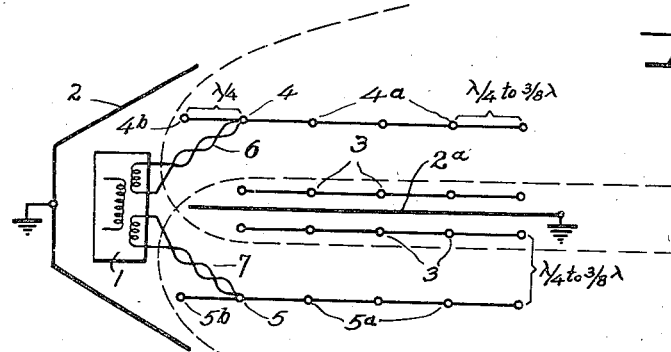
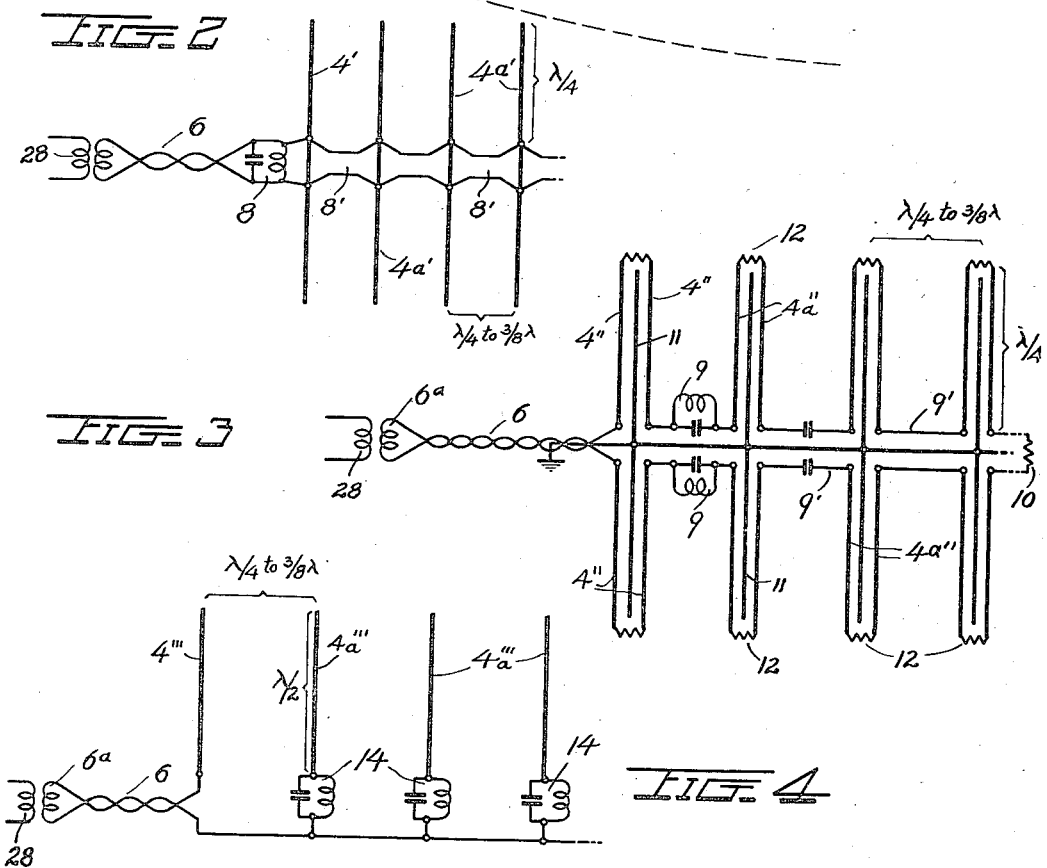
Inventor
DEVENDRA NATH SHARMA,
By John B. Brady
Attorney

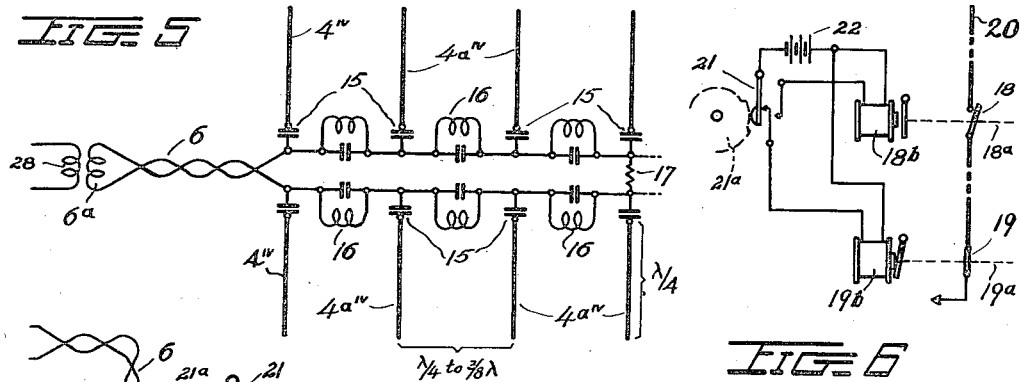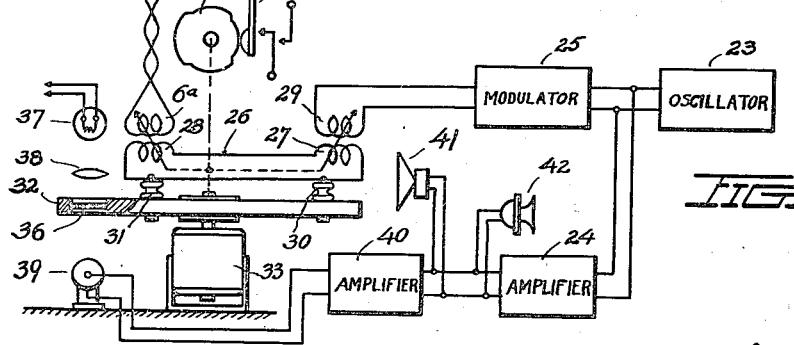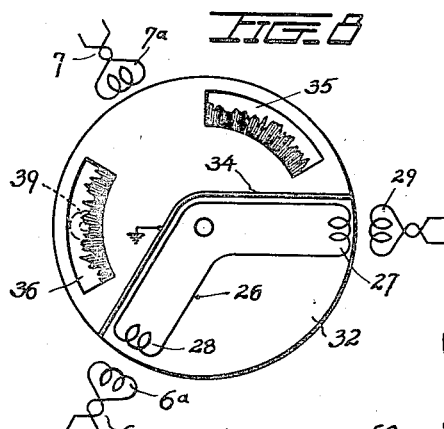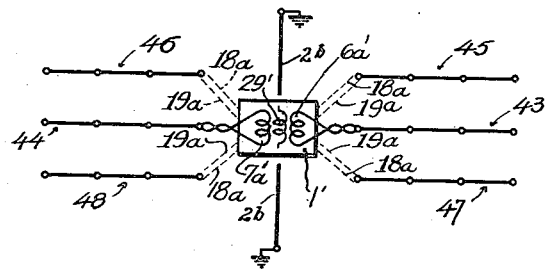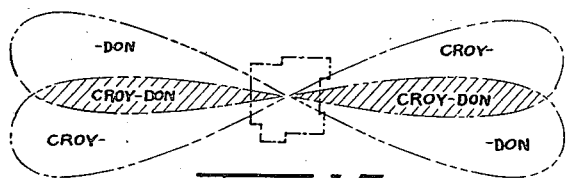

Patented Sept. 19, 1939

2,173,137

UNITED STATES PATENT OFFICE 2,173,137

RADIO BEACON

Devendra Nath Sharma, London, England

Application February 8, 1937, Serial No. 124,785
In Great Britain February 7, 1936

4 Claims. (Cl. 250—11)

(Granted under the provisions of sec. 14, act of
March 2, 1927; 357 O. G. 5)

My invention relates broadly to means for guiding aircraft and ships to their ports of destination, and more particularly to a guiding system utilizing ultra-short and micro-wave electromagnetic radiations in the form of well defined beams.

The subject matter of this invention concerns improvements in the system and apparatus disclosed in my copending application Serial No. 112,182, filed in the United States on November 21, 1936, for "System for landing aeroplanes during bad visibility and for similar navigational purposes". The system of my invention as disclosed therein involves the alternate displacement of a directive electromagnetic radiation on either side of a narrow central zone so that the radiation at all times covers the central zone, and the synchronized alternate modulation of the radiation by signals of cooperative nature, so that both signals are detectible conjointly in the central zone, whereas one or the other is observed on either side of the central zone. My present invention comprises improvements in the propagation of the directive field and in the manner of alternate displacement thereof, with respect to a narrow central zone, as well as the creation of additional novel field patterns and beam arrangements.

One of the objects of my invention is to provide novel and efficient aerial array systems for establishing directive beam formations of the type particularly employed in the navigational system of my invention.

Another object of my invention is to provide dual antenna arrays for the formation of adjacent and narrowly overlapping field zones and means for alternately energizing the separate arrays for establishing a central zone of constant field intensity by the overlapping portions of said fields, while separately modulating the energy radiated from the individual antenna arrays.

A further object of my invention is to provide selective means for alternately coupling a radio transmitter with either of two directive antenna arrays, arranged in proximate relation so that portions of their field zones overlap, and simultaneously alternately modulating the output of the transmitter.

Still another object of my invention is to provide means for alternately modulating the output of a radio transmitter connected with dual antenna arrays, which antenna arrays are adapted to be rendered alternately effective for radiation and reflection, or in lieu of reflection, to radiate or not, alternatively with the modulation.

A still further object of my invention is to provide an arrangement of beam radiations in a field pattern having like aspects of orientation with respect to oppositely extending zones of directive signal energy.

And another object of my invention is to provide oppositely extending zones of directive signal energy by alternatively energizing separate dual antenna arrays, with shield means between the separate dual arrays so that the energy radiated from adjacent antenna arrays may be differently modulated.

Other and further objects of my invention reside in the structures and system arrangements hereinafter more fully described, with reference to the accompanying drawings, in which:

Figure 1 is a plan view of an antenna arrangement for producing the directive field formation employed in the system of my invention; Figs. 2, 3, 4 and 5 indicate schematically in elevation various forms of antenna arrays provided for employment in the system of my invention; Fig. 6 is a schematic diagram illustrating one manner of controlling the effective operation or inoperation of the radiators in the antenna arrays; Fig. 7 is a diagrammatic showing of a transmitter with modulating-switching arrangements for energizing the antenna arrays; Fig. 8 is a detail plan view of a portion of the modulating-switching apparatus shown in Fig. 7; Fig. 9 is a plan view of an antenna arrangement for producing two-way approach zones in the manner of my invention; Fig. 10 is a schematic showing of the field pattern produced by the antenna arrangement shown in Fig. 9; and Fig. 11 shows a field pattern constituting a further adaptation of the system of my invention with other directive signalling beams.

Referring to the drawings in more detail, in Fig. 1 the transmitter is indicated by reference character 1, absorption screening means at 2 for eliminating undesired back radiation in cases where only one approach zone in required, and the dual antenna arrays including component sections 3, 4, 5, are shown separated by an absorption screen 2a which may be used to lend added definition to the field zones produced. The radiating elements of the antenna arrays are indicated at 4, 4a, and 5, 5a; 4 and 5 denoting the two main radiators coupled to the transmitter 1 by transmission lines 6 and 7, respectively, while 4a and 5a represent the resonators, and 4b and 5b the reflectors, which together with the absorptive screens 2 and 2a, constitute the antenna arrays for the directive radiation of energy. Coresonator elements are indicated at 3 and are cooperative with each antenna array 4, 5, on the respective sides of screen 2a, to deform the directive beams radiated into lop-sided beam formations having flat edges substantially paralleled to the line of coresonators 3, as indicated on Fig. 1. The beam formations overlap so that a narrow central approach zone is determined between the flat edges of the adjacent beams.

The beacon installation comprising the various aerial arrays may be subterranean, on the surface of the ground backed by a mound of earth, or from approximately one-quarter to two wavelengths or more in height above the ground surface. The distances between the various elements and sections in the antenna system are indicated on the drawings, as in Fig. 1, where the distance between the radiator and the associated resonators in an array is three-eighths to one-quarter the wavelength used for transmissions, and multiples thereof; between the radiator and associated reflector, about one-quarter wavelength; and between the main antenna array and the coresonator elements or the earthed screen 2a, from three-eighths to a quarter of the wavelength. The arrays may be arranged to radiate horizontally or vertically polarized electromagnetic waves.

In order to establish directive beam formations of adequate definition, I have devised a number of antenna arrays especially adapted to the beam system of my invention. Figs. 2, 3, 4 and 5 illustrate different examples of antennae which may be coupled to a single or to dual transmitters for operation in the system of my invention.

My copending application relates principally to a single radiation system having opposite reflectors alternately operative to deflect the beam from side to side. My present invention, as illustrated in Fig. 1, employs dual radiation means capable of establishing separate fields, and I provide in conjunction therewith, means for alternatively energizing the radiation means to establish alternate fields which partially overlap, as will be more fully set forth.

It will be understood that any of the antenna arrays shown in Figs. 2-5 may be employed in the radiation systems 4, 5, in the arrangement of my invention shown in Fig. 1; reference characters pertaining to the radiating system 4 and the transmission line 6 being employed in Figs. 2-5 to indicate the relation thereof to Fig. 1. The total physical or electrical length of each arm of the radiating systems shown corresponds to half, of if grounded, to quarter the wave-length of the frequency used in the transmission. The distances between the arms, as already indicated in Fig. 1, vary between three-eighths and a quarter wavelength, approximately.

In Fig. 2, compensating inductances and/or capacities may be inserted as indicated at 8 and corresponding positions 8', with respect to each radiator, in order to insure correct phase relations in the various arms of the array. The radiators in Fig. 2 are indicated at 4' and 4a' coupled with the output coil 28 through transmission line 6.

In Fig. 3, compensating inductances and/or capacitances may be employed as at 9, and similarly at 9', where necessary to maintain proper phase relations. The system in Fig. 3 being one of series connection of radiators 4'' and 4a'' with transmission line 6 and coupling coil 6a, the ends of the connectors are joined through a suitable resistance at 10. An isolated rod 11 of length about one-quarter wavelength and connected with ground, may be coupled inductively to each of the folded arms of the array shown in Fig. 3, wherein each half portion 4'' or 4a'' of the folded arm represents a primary or a secondary while the isolated rod 11 represents the core of a transformer thus constituted. Resistances also may be employed as at 12 between the free ends of the half portions 4'' or 4a'' of the folded arms to further insure adequate coupling between the folded arms constituting the radiators in this series connected form of antenna array.

In Fig. 4 is shown a parallel arrangement of $4'''$ and $4a'''$ radiators connected with the transmission line feeder 6, in which the radiators are coupled through space. Suitable compensating inductances and/or condensers may be employed as shown at 14, in connection with individual radiators for phase adjustments.

In Fig. 5 is shown a modified series arrangement of feeder 6 with radiators $4^{iv}$ $4a^{iv}$ capacitively coupled to the line, as at 15, with inductive and capacitive means provided in the line at 16 for adjusting phase relations between the connections and the corresponding radiators. As in Fig. 3, a resistor is employed, as at 17, for closing the series line.

It is to be noted in all instances in Figs. 2-5, that any number of such arms, 4, 4a, vertical or horizontal, may be employed to form an array for the directional transmission of electromagnetic radiations.

Referring now to means for alternatively energizing the radiation means to establish alternate fields, Fig. 6 illustrates schematically one arrangement for effectively altering the radiation characteristics of the antenna array directly by electromagnetic relays and switching means. It is well known that a rod having a natural resonant frequency less than an adjacent radiator, acts as a reflector of the electromagnetic energy radiating from the radiator. Conversely, if the resonant frequency of the rod is greater than that of the radiator, or equal to it, the rod will act as a resonator, or as what is commonly termed a "director".

Now, if the individual rods constituting the arms of the radiator and resonator systems 4, 5, Fig. 1 are divided into two or more sections of suitable lengths, as indicated in Fig. 6 on a rod 20, by way of example, and switches 18 and 19 are provided between the sections, when switch 19 alone is closed the rod will act as a resonator or as a radiator, at the natural frequency of the effective length connected; and when switches 19 and 18 are both closed, the rod will act as a reflector. When both switches 18 and 19 are open, the rod will cease to be operative in any manner. By providing similar switching means in each rod in an antenna array, and interconnecting corresponding switches as indicated at 18a and 19a in Fig. 6, the transmission characteristics of the entire array may be conveniently controlled. The switches may be conveniently actuated through the connections 18a, 19a, by means of separate relay devices 18b, 19b, controlled in sequence by a switch mechanism 21 in circuit with a source of current at 22. The switch mechanism may be operated in synchronism with modulating means producing a signal for transmission from the respective antenna array. Similarly, switching and switch actuating means may be provided in an adjacent antenna array and be controlled in synchronism with separate modulating means, so that the arrays may be alternately energized for transmitting separate signal modulations in adjacent overlapping fields, in accordance with my invention. The apparatus shown in Fig. 7 may be employed to effect such alternate operation by providing a suitable cam element such as at 21a set in predetermined relation to the modulating signal means, in lieu of the arrangement for alternate coupling now to be described with reference to Figs. 7 and 8.

In the preferred form of my invention, the transmitter which comprises oscillator 23, signal input amplifier 24, and modulator 25, is coupled through a link circuit 26 including inductances 27 and 28 coupled respectively with the output coil 29 of the transmitter and one or the other of the transmission lines 6, 7, by means of input coil 6a or 7a. The link circuit 26 is supported by insulators 30, 31, on a disk 32, which is rotatably driven by motor 33.

Fig. 8 illustrates more clearly the arrangement of the link circuit 26 on the disk 32, and shows that the coils 27, 28, are disposed with 120° spacing and coupled with coils 29 and 6a similarly spaced. Coil 7a is disposed intermediate and 120° from the coils 6a and 29, so that as the disk 32 rotates, carrying the link circuit 26, coil 29 is linked alternately with coils 6a and 7a. A shield screen device 34 is arranged to eliminate stray coupling with the coil (7a in Fig. 8) not linked with the output coil 29.

The disk 32 also carries modulating means consisting, in the form disclosed, in photographic film records 35, 36, carried in arcuate openings in the disk 32. As shown in Fig. 7, the film record is scanned by light from a source 37 which is focused by a lens 38 through the film record onto a photosensitive cell 39, which is connected through a pre-amplifier 40 to the signal input amplifier 24 of the transmitter. A monitor loud speaker is provided at 41; and additional signal input means, such as a microphone 42, may be connected with the signal input amplifier, as shown. The film records are arranged in synchronized relation on the disk with respect to the link circuit and the photocell 39 so that the signal recorded on each film will be selectively impressed on the radiations transmitted from one only of the antenna arrays, through transmission line 6 or 7.

By this system of modulation it will be seen that it is possible to modulate the separate beams by signals which are syllabic portions of the name of the station transmitting; for example, I have used the syllables "Croy" and "don" in tests at the Croydon aerodrome, London, the syllable "Croy" being heard in the zone, say, on the right, while the syllable "don" would be heard on the left, the conjoined syllables being heard in the central approach zone in the full name of the station, "Croy-don".

Any similar means for modulation may be employed, such as a phonograph turntable and record, properly synchronized, or a continuous film or a magnetized steel band, suitably driven in synchronism and having its scanning or pick-up means connected as illustrated for the photocell arrangement in Fig. 7.

Instead of the aforesaid switching means or link circuit for alternately connecting the transmitter with the separate antenna arrays, which systems are suitable for certain operating conditions, I may employ direct contacts carried by the rotatable disk in positions similar to the coupling coils and the link circuit shown in Fig. 8, this arrangement having the advantage of decreasing mutual interference and stray inductive effects.

In certain instances it may be desirable to employ a two-way approach zone instead of one, and accordingly the aerial arrays and corresponding side screens may be extended to both sides of the transmitter, as indicated in Fig. 9. The type of antenna arrangement shown in Fig. 9 is similar to that of my copending application hereinbefore noted, wherein a central radiation system is employed in combination with alternately effective side screens for deflecting a directive beam from side to side; but it will be understood that the antenna arangement shown herein in Fig. 1, employing separate radiation systems alternately energized, may be substituted for producing each of the approach zones in the manner of Fig. 9. The field pattern resulting from the operation of either system in the form of my invention shown in Fig. 9, is illustrated in Fig. 10, and it will be noted that in either approach zone, when moving toward the station, the same signal is heard on the right or left side regardless of the direction of approach. There is therefore no confusion such as results when two approach zones are formed from only two beams directively propagated in 180° angular displacement; there being, in such instances, a reversal of the signals when approaching the station from opposite directions.

I accomplish this improved arrangement in the manner shown in Fig. 9, where the radiator systems 43 and 44 (which may be of any of the types shown in Figs. 2-5) are prorvided with side screens 45, 47, and 46, 48, respectively; screens 45 and 48 being diagonally disposed with respect to the transmitter 1'; and adapted to be synchronously operative with one modulation signal, while the screens 46 and 47 likewise adapted for synchronous operation with a complementary modulation signal. The operation of each set of screens is alternative; that is, when screens 46 and 47 are reflective in synchronism with the modulation, say, by the syllable "Croy-", screens 45 and 48 are ineffective or in resonance with the radiation systems 43 and 44, respectively. And conversely, when screens 45 and 48 are reflective in synchronism with the complementary modulation "-don", screens 46 and 47 are ineffective, or in resonance with the radiation systems 44 and 43, respectively, which results in the field pattern shown in Fig. 10. Screens 2b are provided between the alternately operative deflective screens 45 and 46, and 47 and 48, in order to improve the definition of the directive beams. The screens 45, 46, 47, 48, may conveniently be operated by means similar to that shown in Fig. 6, as indicated by connections 18a, 19a in conjunction with modulation means such as shown in Fig. 7 and indicated in Fig. 9 wherein output coil 29' is in direct coupled relation to coils 6a' and 7a' feeding the antenna arrays 43 and 44 respectively; or by modified arrangements of the means shown in my copending application, Serial No. 112,182.

In Fig. 11, I have shown the overlapping field pattern of the fundamental system of my invention in conjunction with a boundary marker beam 49 propagated from an antenna preferably at the position 52, and a descent commencing signal beam 50 propagated from an antenna preferably at the position 53. I also provide a precise localizing beam 51 at right angles to the boundary marker beam 49 and in the middle of the central approach zone established by the fundamental system of my invention. The beam 51 is a low powered radiation emanating from a horizontal dipole backed by a reflector and positioned substantially at the site of the main transmitter, indicated at 54 on Fig. 11. The beam 51 is modulated by a distinctive signal such as a syllabic "OK" or "on course." Micro or infrared rays may be employed in this beam, or the radiation may be at the same frequency as that in the boundary marker beam 49, and be derived from the same transmitter. The width of the localizing beam 51 is restricted to preferably one-eighth to one-half the width of the aerodrome so that blind landings may be made with a high degree of safety.

It will be understood that the extended approach zone formed by the overlapping directive beams is fairly wide, and unless an aeroplane proceeding along the approach zone passes into the localizing beam 51, the pilot may not land during periods of zero visibility. However, when the localizing beam is met, by suitable maneuvering within the approach zone and the side beams, the pilot may land blindly in accordance with altitude indications received from a 20–30 foot indicating pendulum suspended from the aircraft and terminating in a glass bulb, mercury filled, or a filament lamp, or by any other suitable means for giving altitude indications on the dash-board of the aircraft.

It is particularly noted that the modulating means shown in Figs. 7 and 8 is especially adaptable for signalling the name of the station approached instead of the commonplace A-N Morse code combination which is generally employed at all stations. This is an important and novel feature of my invention, and one which has exceptional possibilities for use in relatively crowded areas where beacons at airports even fifty miles apart might easily be mistaken, as to identity of station, by pilots flying blindly. Where the name of the stations forms part of the beacon arrangement, as provided in the system of my invention, the pilot is advised not only of his course but also of the station approached. It will be further understood that the record may also bear added information such as reports on weather and field conditions, and may be interchangeable in the structure disclosed.

Thus while I have disclosed my invention in certain preferred embodiments, no limitations are intended thereby upon my invention, but only such limitations as are imposed by the scope of the appended claims.

Having now particularly described and ascertained the nature of said invention and in what manner the same is to be performed, I declare that what I claim is:

1. In combination, electromagnetic beam transmissions for use in navigation including dual beams alternately transmitted in adjacent overlapping relationship so as to form a narrow middle zone, and a localizing beam of a width substantially less than the width of said zone transmitted longitudinally of said zone adjacent one end thereof.

2. In combination, electromagnetic beam transmissions for use in navigation, including dual beams alternately transmitted in adjacent overlapping relationship so as to form a narrow middle zone, a plurality of marker beams disposed transversely of said zone, one of said marker beams being a field boundary marker, and a localizing beam of a width substantially less than the width of said zone transmitted longitudinally of said zone and crossed with said boundary marker beam.

3. In combination with electromagnetic beam transmissions for use in navigation employing dual beams alternately transmitted and differently modulated, switching-modulating means comprising a rotatable disk member, selective coupling means actuated by said disk member for alternately applying energy to said dual beams, and modulating means including different signal records actuated by said disk, said coupling means and said modulating means being synchronized in said rotatable disk member.

4. In combination, electromagnetic beam transmission means comprising a radio transmitter, means for modulating the transmitter including photoelectric pick-up means and a plurality of photographic signal records, a multiplicity of antenna arrays, means for successively energizing said antenna arrays from said transmitter including selective coupling means, and actuating means connected with said photographic signal records in said modulating means and with said selective coupling means in predetermined relation for synchronously modulating and energizing said antenna arrays.

DEVENDRA NATH SHARMA.